(12) United States Patent
Jung

(10) Patent No.: US 9,240,962 B2
(45) Date of Patent: Jan. 19, 2016

(54) GROUP MESSAGING SYSTEM AND METHOD FOR PROVIDING FILE SHARING THROUGH BIDIRECTIONAL INTERLOCK WITH A CLOUD SERVER

(71) Applicant: NHN Corporation, Seongnam-si (KR)

(72) Inventor: Jeanie Jung, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 317 days.

(21) Appl. No.: 13/757,170

(22) Filed: Feb. 1, 2013

(65) Prior Publication Data
US 2013/0198304 A1   Aug. 1, 2013

(30) Foreign Application Priority Data
Feb. 1, 2012   (KR) ........................ 10-2012-0010357

(51) Int. Cl.
  H04L 12/58  (2006.01)
  H04L 12/18  (2006.01)

(52) U.S. Cl.
  CPC ............ *H04L 51/00* (2013.01); *H04L 12/1818* (2013.01); *H04L 51/04* (2013.01)

(58) Field of Classification Search
  CPC ..... H04L 12/1818; H04L 51/00; H04L 51/04; H04L 12/58
  See application file for complete search history.

(56) References Cited

U.S. PATENT DOCUMENTS

| | | | |
|---|---|---|---|
| 2007/0019622 A1* | 1/2007 | Alt et al. ....................... | 370/352 |
| 2008/0016160 A1* | 1/2008 | Walter et al. .................. | 709/206 |
| 2008/0091761 A1* | 4/2008 | Tsao ............................. | 709/201 |
| 2008/0098062 A1* | 4/2008 | Balia ............................ | 709/203 |
| 2011/0072098 A1* | 3/2011 | Moudy et al. ................. | 709/206 |
| 2011/0145516 A1* | 6/2011 | Adl-Tabatabai et al. ..... | 711/152 |
| 2012/0136746 A1* | 5/2012 | Lange .......................... | 705/26.3 |
| 2012/0137360 A1* | 5/2012 | Henderson ...................... | 726/17 |
| 2012/0259925 A1* | 10/2012 | Braudes ........................ | 709/206 |
| 2013/0019195 A1* | 1/2013 | Gates ............................ | 715/771 |
| 2013/0054684 A1* | 2/2013 | Brazier et al. ................ | 709/203 |

FOREIGN PATENT DOCUMENTS

| | | |
|---|---|---|
| KR | 1020100060498 | 6/2010 |
| KR | 10-1035302 | 5/2011 |

OTHER PUBLICATIONS

Communications / Internet I Samsung Electronics, the world's 120 countries, language support—62' chaeton' public service; Asian Economics News (www.asiae.co.kr/news/print.htm?idxno=201108290947215401&udt=1), Aug. 29, 2011, printed Feb. 27, 2013 (translated by machine from Korean to English on Apr. 26, 2013).

* cited by examiner

*Primary Examiner* — Ebrahim Golabbakhsh
(74) *Attorney, Agent, or Firm* — Greer Burns & Crain Ltd.

(57) ABSTRACT

Disclosed herein is a group messaging system for providing file sharing through bidirectional interlock with a cloud server, including: a messenger server receiving information requesting creation of a group chatting room including group members and instructing user terminals of the respective group members to create the group chatting room; and a cloud server interlocking with the messenger server, receiving information about the creation of the group chatting room from the messenger server, and creating a sharing group mapped to the group chatting room in a one-to-one scheme.

22 Claims, 12 Drawing Sheets

FIG. 12

| cloud group sharing room | | | | | | | |
|---|---|---|---|---|---|---|---|
| group creator | gongu1(DDD) | ⊞upper rank ⟳refresh \| ▦view▼ ▦arrangement▼ \| 🗁new folder | | | | | |
| member | gongu1_1(AAA) | sharing room of group abcde | | | | | |
| | gongu1_2(CCC) | file name | registrant | current state | last modifying date | preservation limit | replay |
| | gongu1_3(BBB) | FF.doc | AAA | during work | 2012.1.12 | 5.5 | sharing |
| | ... | FF2.hwp | CCC | stored | 2012.1.11 | 4.8 | read |
| | | ... | ... | ... | ... | ... | ... |
| group chatting window shortcut | | | | | | | |

1210 — group creator
1220 — member
1230 — group chatting window shortcut
1240 — new folder
1200

GROUP MESSAGING SYSTEM AND METHOD FOR PROVIDING FILE SHARING THROUGH BIDIRECTIONAL INTERLOCK WITH A CLOUD SERVER

CROSS-REFERENCE TO RELATED APPLICATIONS

This application claims priority from and the benefit of Korean Patent Application No. 10-2012-0010357, filed on Feb. 1, 2012, which is hereby incorporated by reference for all purposes as if fully set forth herein.

BACKGROUND

1. Field

The present invention relates to a file sharing system and method through an instant messenger, and more particularly, through a group messaging system through a bidirectional interlock between a messenger server and a cloud server.

2. Discussion of the Background

Generally, the Internet is an open network configured to apply a common protocol called a Transfer Control Protocol/Internet Protocol (TCP/IP) to participant computers. Users of the Internet may use various services, such as, exchange multimedia information, exchange an e-mail, exchange a file, navigate the World Wide Web (WWW), and the like, as well as, exchange basic character information.

With a rapid increase in the use of the Internet domestically and globally, importance of the Internet as a strategic tool for increasing efficiency and productivity over all of the existing industries has rapidly increased. New business opportunities through the Internet have also been continuously created and fields of the new business opportunities through the Internet have expanded. Operators using the Internet have also gradually increased.

Users use a homepage, an e-mail, a telephone auto response service (ARS), or the like. However, the homepage and the e-mail feature low real time customer communication. The telephone ARS imposes a high communication cost on the user.

Instant messaging (hereinafter, referred to as a 'messenger') is useful for transferring information in real time using the Internet. An object of the messenger is to transfer a simple message between users in real time. When the messenger is used, two users may talk in real time through characters transferred, as if they directly converse with each other. The messenger's real time feature transfers an input content of the message immediately to the participant.

A messenger client program also transmits emoticons, flashcons, giftcons, or the like, to a chat participant through a messenger chatting window. The messenger client program also transmits a file using the chatting window as well as a function of simply transferring a message.

There is also a group chatting function where several persons may chat through a single chatting window as well as 1:1 chatting. In order to perform the group chatting, the user selects a plurality of chatting participants in the messenger client program to request the plurality of chatting participants for the chatting, thereby creating a group chatting window or adding chat to a created chatting window.

In order to transmit a file to the plurality of chatting participants, the user drags and drops a file to be transmitted in the group chatting window or selects a file transmission command in the messenger client program. FIG. 2 illustrates a method for transmitting a file in a group chatting window according to the related art. When the transmission of the file to the participants in the messenger chatting group is executed, a file transmission state 220 for group members 210 is displayed in a group chatting window 200. When one of the group members 210 requests file transmission, the file is transmitted to each of other group members 210. The transmission of the file is displayed to each of the group members 210 and starts when corresponding group members 210 allow file transmission.

FIG. 1 illustrates a system for sharing a file in a messenger according to the related art. A sender accesses a messenger server 120 using a terminal 110, for example, a personal computer, a laptop computer, a smart phone, or the like, to execute a messenger program and create a group chatting window. The sender transmits a file 101 stored in a terminal 110 or a personal cloud server 100a to the participants participating in group chatting through the group chatting window shown in FIG. 2.

The file 101 transmitted by the sender is transmitted to user terminals 130 of the recipients in a peer to peer (P2P) scheme or a temporary storage of the messenger server 120. The recipients accept a file to be received through the group chatting window, and the file is transmission starts. The respective recipients may receive the file through a mobile client program and store the received file in a personal cloud server 100b, or store the received file in a local device or a personal cloud server 100c through a desktop client installed in the PC, or the like. The recipients may store the received file in a local device or a personal cloud server 100d through a web client.

The method for sharing a file through a messenger according to the related art has the following problems. First, a single file is repeatedly transmitted to each of a plurality of recipients, such that an overload may be incurred in a network. When the number of users participating in the group increases, network load is generated, and the same file is repeatedly copied in the local devices or the personal cloud servers of several users.

Further, in the related art, complexity of a group activity process like file synchronization is high. Because transmitted individual files are present in the local devices or the personal clouds of each of the users. When a specific recipient modifies the stored file, synchronization between the modified file and files stored in the local devices or the personal clouds of other users is not performed. In an environment in which a file transfer client is not installed in the messenger, group file sharing becomes inconvenient.

A method for compressing and transmitting a file in a cloud system has been described in Korean Patent No. 10-1035302 entitled "Cloud System and Method of Compressing and Transmitting Files in Cloud System" by ESTsoft Corp. However, Korean Patent No. 10-1035302 does not provide a method for sharing a file between users formed as a group through a messenger, and does not solve problems, such as, overload in a network and an increase in complexity of a group activity process for a shared file, even though the technology disclosed is combined with the messenger.

Therefore, a method for effectively sharing a file between group chatterers of a messenger and a method for effectively controlling a group activity for a shared file would be useful.

BRIEF SUMMARY OF THE INVENTION

A group messaging system, method, and computer readable recording medium for providing file sharing through bidirectional interlock with a cloud server is described. The sharing of a file through the cloud server between chat participants by allowing a messenger server and the cloud server to interlock with each other and setting a sharing group to be mapped to a chat room of a messenger in the cloud server is described.

A group messaging system, method, and computer readable recording medium for managing a group file through a messenger by allowing a messenger server and the cloud server to interlock with each other and informing that an activity is generated for a file managed within a sharing group in the cloud server through a chat room of a messenger mapped to the sharing group is described.

Additional features of the invention will be set forth in the description which follows, and in part will be apparent from the description, or may be learned by practice of the invention.

According to exemplary embodiments of the present invention, there is provided a group messaging system including: a messenger server configured to receive a request providing group members of a group chatting room to be created, configured to create the group chatting room, and configured to instruct a user terminal corresponding to one or more of the group members to create a group chatting window; and a cloud server configured to interlock with the messenger server, configured to receive information about the creation of the group chatting room from the messenger server, and configured to create a sharing group mapped to the group chatting room in a one-to-one scheme.

According to exemplary embodiments of the present invention, there is provided a messenger server including: a group chatting room managing unit configured to receive a request providing group members of a group chatting room to be created, configured to create the group chatting room, and configured to instruct a user terminal corresponding to one or more of the group members to create the group chatting window; a storage configured to store the group chatting group and the group members; and a cloud server interlock processing module configured to interlock with a cloud server and configured to request the cloud server to create a sharing group mapped to the created group chatting room in a one-to-one scheme, when the group chatting room is created through the group chatting room managing unit.

According to exemplary embodiments of the present invention, there is provided a cloud server including: group sharing folder managing unit configured to create a sharing group according to a request from a user terminal, wherein the request includes group members of the sharing group; a storage configured to store the sharing group chatting; and a messenger server interlock processing module configured to interlock with a messenger server, and configured to request the messenger server to create a group chatting room mapped to the sharing group in a one-to-one scheme when the sharing group is created through the group sharing folder managing unit.

According to exemplary embodiments of the present invention, there is provided a group messaging method performed by a messenger server, the group messaging method including: receiving, at the messenger server, a request providing group members of a group chatting room to be created; creating the group chatting room; instructing a user terminal corresponding to one or more of the group members to create the group chatting window; and requesting, from the messenger server, an interlock with a cloud server to create a sharing group mapped to the group chatting room in a one-to-one scheme.

According to exemplary embodiments of the present invention, there is provided a group messaging method performed by a user terminal, the group messaging method including: receiving, on the user terminal, information related to creation of a group chatting window including group members from a messenger server and creating the group chatting window based on the information; and receiving selection of a file and uploading the selected file, on the user terminal, through the group chatting window, wherein the uploaded file is stored in a sharing group folder mapped to the group chatting room of a cloud server, wherein the sharing group and the group chatting room are in a one-to-one scheme, and wherein when activity for the file stored in the sharing group folder is generated, the activity information is received and displayed on a chatting window of the created group chatting window.

According to exemplary embodiments of the present invention, there is provided a non-transitory computer readable medium including an executable program which, when executed, performs a method for group messaging of a messenger server, the method including: receiving, at the messenger server, a request providing group members of a group chatting room to be created; creating the group chatting room; instructing a user terminal corresponding to one or more of the group members to create the group chatting window; and requesting, from the messenger server, an interlock with a cloud server to create a sharing group mapped to the group chatting room in a one-to-one scheme.

Information for receiving the group messaging method for providing file sharing is through bidirectional interlock with a cloud server may be stored in a server computer readable recording medium. The recording medium may include all kinds of recording media in which a program and data are stored so as to be readable by a computer system. The recording medium may include a read only memory (ROM), a random access memory (RAM), a compact disk (CD), a digital video disk (DVD) ROM, a magnetic tape, a floppy disk, an optical data storage, or the like, and a medium implemented in a form of a carrier wave (for example, transmission through the Internet). The recording medium may be distributed in a computer system connected by a network, such that a computer readable code may be stored and executed in a distributed scheme.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 12 illustrates a cloud group sharing room according to exemplary embodiments of the present invention.

DETAILED DESCRIPTION OF THE ILLUSTRATED EMBODIMENTS

Figure 1:
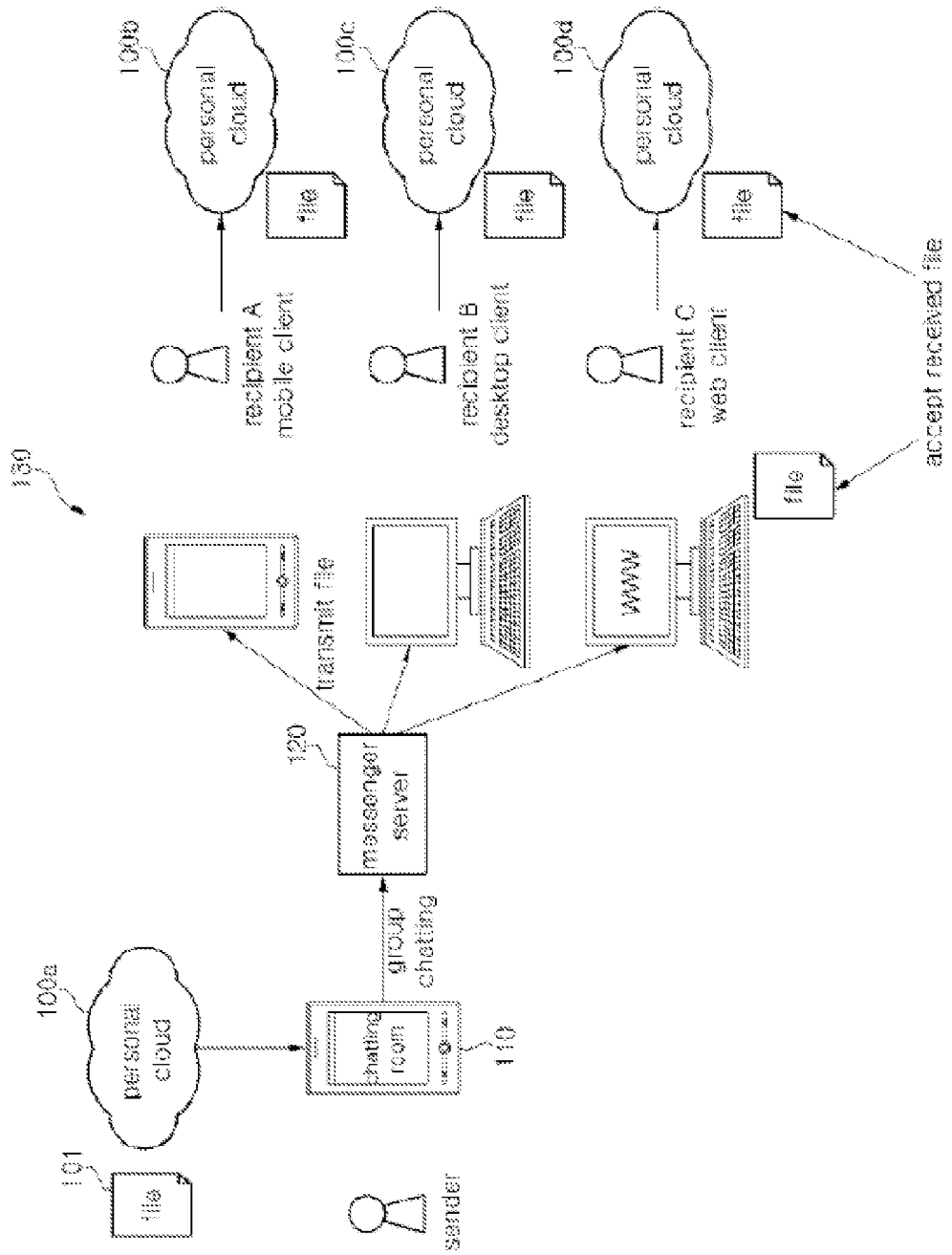
FIG. 1 illustrates a system for sharing a file in a messenger according to the related art.
Figure 2:
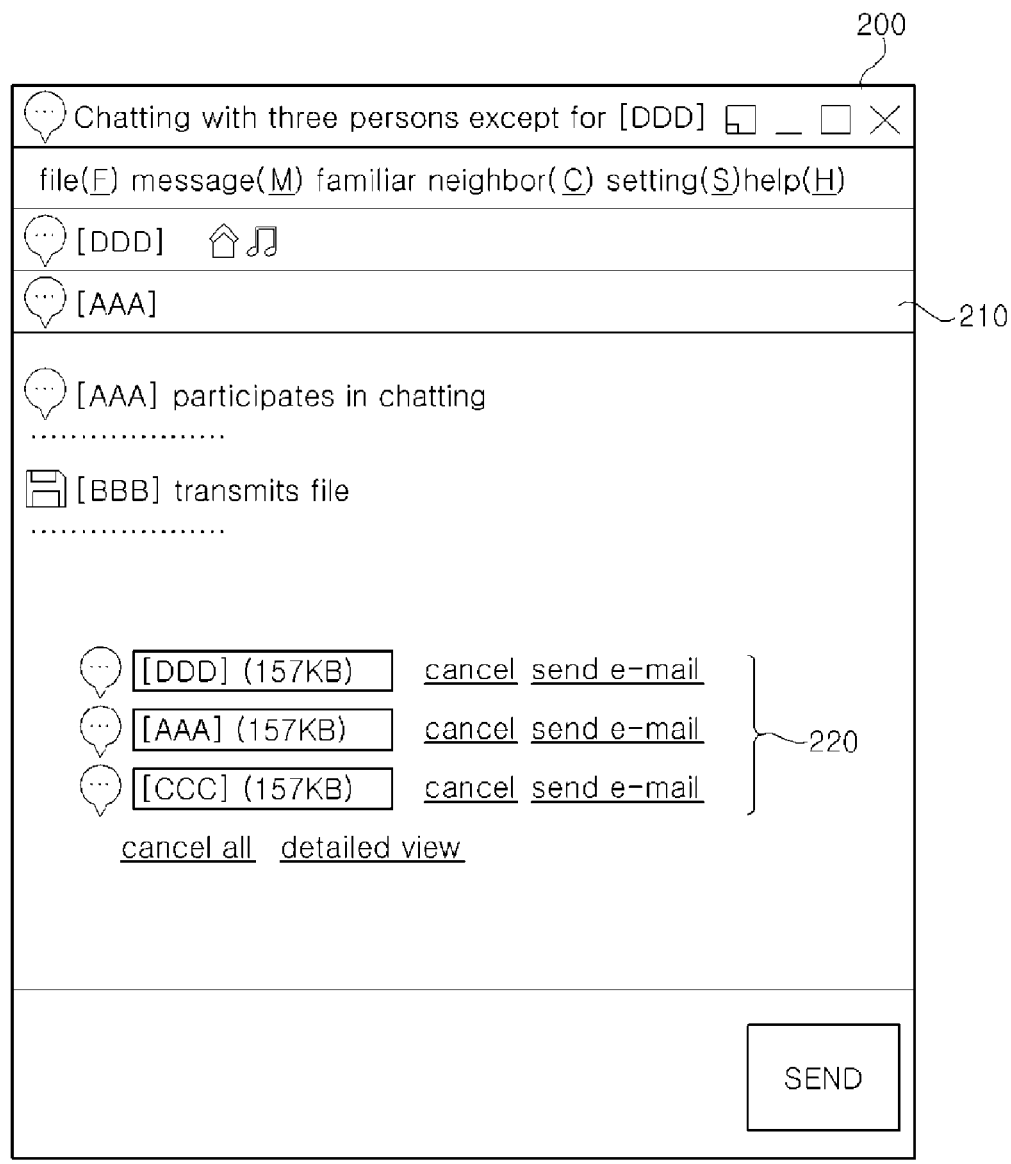
FIG. 2 illustrates a method for transmitting a file in a group chatting window according to the related art.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

In addition, embodiments described in the specification are wholly hardware, and may be partially software or wholly software. In the specification, "unit", "module", "device", "system", or the like represents a computer related entity such as hardware, combination of hardware and software, or software. For example, in the specification, the unit, the module, the device, the system, or the like may be an executed process, a processor, an object, an executable file, a thread of execution, a program, and/or a computer, but are not limited thereto. For example, both of an application which is being executed in the computer and a computer may correspond to the unit, the module, the device, the system, or the like in the specification.

Hereinafter, exemplary embodiments of the present invention will be described in detail with reference to the accompanying drawings.

A method for transmitting a file to all of group members and sharing the file with all of the group members using a group messaging function is described. The group messaging function can include a chatting function between multiple parties through a group chatting window of an Internet messenger. According to the exemplary embodiments of the present invention, cloud file sharing through group messaging is enabled by allowing a messenger server and a cloud server to utilize an interlock protocol with each other by mapping a chatting group and a cloud sharing group to each other.

When a group chatting room (or a group chatting window) is created, a sharing group in the cloud server interlocking with the group chatting room may be automatically created. In some embodiments, the sharing group can be manually created in response to a command, prompt or pop up window request. When a file to be shared is transmitted through the group chatting room, the transmitted file is stored in a storing space allocated to the sharing group in the cloud server. The members of the group chatting may read an uploaded file shared in the cloud server and perform various activities, for example, group work, reading, opinion exchange, evaluation, comment registration, and the like, related to the uploaded file.

According to exemplary embodiments of the present invention, when the sharing group is set in the cloud server, various activities performed in the sharing group may be notified by the group chatting window.

Although the present invention has been described for a mobile messenger in a mobile terminal, the present invention may also be applied to any terminal capable of providing a function of the present invention. For example, the present invention may be applied to all user terminals capable of executing an application, including a fixed terminal, such as, a desktop computer, a television, or the like, and a mobile terminal, such as, a smart phone, a laptop computer, a digital broadcasting terminal, a personal digital assistant (PDA), a portable multimedia player (PMP), a navigation apparatus, or the like. The present invention is applied to a terminal that may access at least one of a wired and wireless network.

Concept of group messaging interlocking with cloud storage

Figure 3:
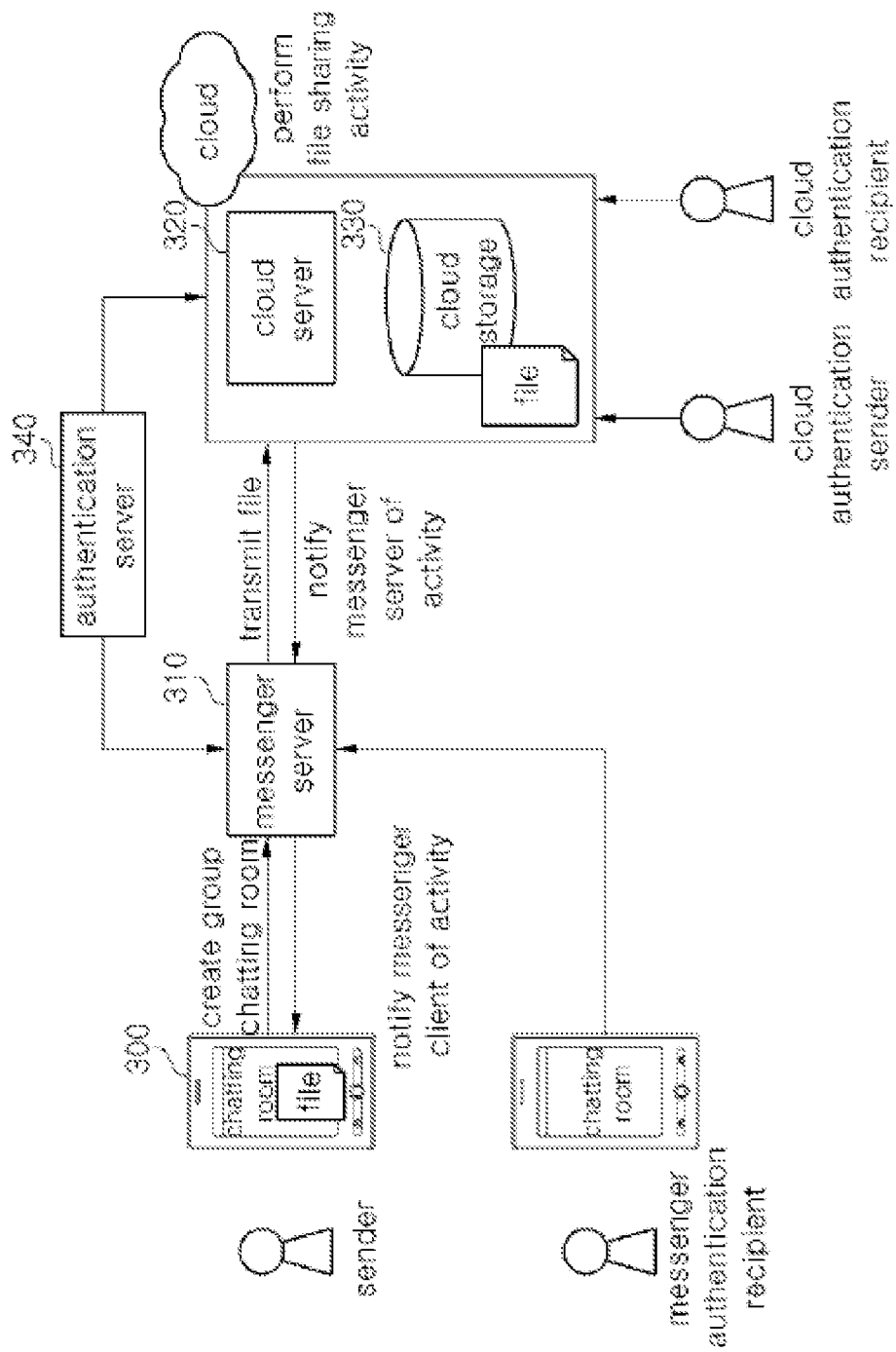
FIG. 3 illustrates an interlock between a messenger server and a cloud server according to exemplary embodiments of the present invention.

FIG. 3 illustrates an interlock between a messenger server and a cloud server according to exemplary embodiments of the present invention. A user may execute a messenger client program through a terminal 300 (for example, a smart phone, a desktop computer, or the like) to access a messenger server 310 and create a chatting room (or a chatting window). When a plurality of chatting participants is selected, a group chatting room may be created and a plurality of users may perform chatting in a group chatting room.

The messenger server 310 may be synchronized with a cloud server 320, and a cloud sharing group corresponding to the group chatting room created through the messenger server 310 may be created through the cloud server 320. A work space of the cloud sharing group is allocated to a cloud storage 330 to enable a file to be shared, read, and worked on.

When a specific user (sender) selects a file stored in the user terminal 300, which is a local device, and transmits the selected file through the group chatting room using the terminal 300, the transmitted file is mapped to a chatting group of the messenger through the messenger server 310 and the cloud server 320 in a one-to-one scheme to be stored in an allocated space (that is, a space allocated to a set cloud sharing group in the cloud storage 330) of the set cloud sharing group.

The respective sharing group members may access the file stored in the cloud storage 330 through the group chatting room of the messenger client program using their user terminals 300. To use the file stored in the cloud storage 330 the group members may directly log in and access the cloud server 320, rather than access through the group chatting room. The messenger server 310 and the cloud server 320 may interlock with each other and the user may be authenticated through an authentication server 340.

A service operator of the messenger server 310 and a service operator of the cloud server 320 may be the same operator or may be different operators. The operators may simultaneously authenticate the users using the same authentication server 340. The operators may authenticate the users by sharing information with each other.

When sharing groups are mapped to each other in the one-to-one scheme by interlock between the messenger server 310 and the cloud server 320, various interlock functions according to the exemplary embodiments of the present invention may be provided. When a cloud authentication recipient accesses the cloud server 320 to perform various activities using a shared file, the cloud server 320 and the messenger server 310 of a user included in the shared corresponding group may be notified. Therefore, the respective members participating in the group chatting room may confirm an activity situation for the shared file in real time.

An example of the notified file sharing activity may include creating of a sharing group, uploading or downloading of the file, reading, modifying editing of the file (for example, moving picture viewing, document editing, or the like), adding of meta information to the shared file, reply or comment to the file, evaluation mark registration, and the like.

When the user accesses the cloud server 320 to upload the file and create the sharing group, information on the sharing group may be transmitted to the messenger server 310 interlocking with the cloud server 320. The messenger server 310 creates a group chatting room corresponding to the cloud sharing group created in the cloud server 320 in the one-to-one scheme and notifies the cloud server 320 of various file related activities performed in the cloud sharing group. When creating a group, the messenger server 310 may simultaneously notify group members logged in the messenger server 310 that the group chatting room has been created.

All activities generated in a space allocated to a sharing group of the sharing cloud storage 330 may be transmitted to the messenger server 310 through the cloud server 320, and the messenger server 310 may notify members in the group of all activities through a group chatting window, individual chatting windows, notifying windows, or the like.

When sharing group members are set by accessing the cloud server 320 and a specific member uploads a file, the messenger server 310 interlocking with the cloud server 320 may automatically create the group chatting room and notify the members of the file uploaded in the sharing cloud storage 330 through the group chatting room of the messenger.

Figure 4:
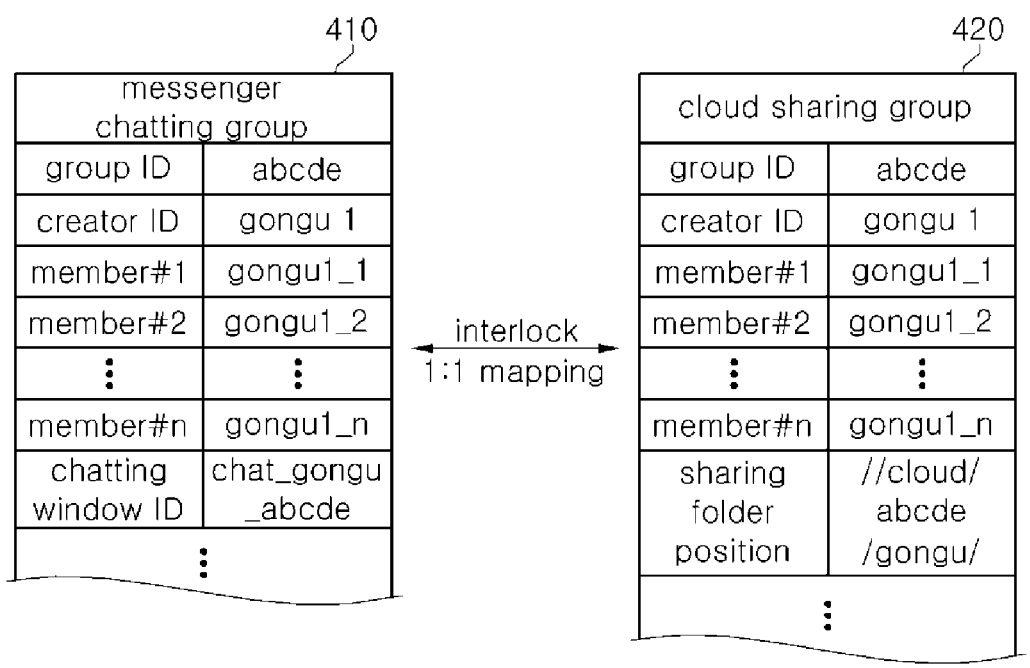
FIG. 4 illustrates interlock between a messenger chatting group and a cloud sharing group according to the exemplary embodiments of the present invention.

FIG. 4 illustrates interlock between a messenger chatting group and a cloud sharing group according to the exemplary embodiments of the present invention. A messenger chatting group 410 created through the messenger server 310 and a cloud sharing group 420 created through the cloud server 320 interlocking with the messenger server 310 are mapped to each other. The mapping can be in a one-to-one scheme to exchange information with each other. For example, when a messenger chatting group 410 (group sharing room) is created through the messenger server 310, a corresponding cloud sharing group 420 is created through the cloud server 320. Likewise, when a cloud sharing group 420 is created through the cloud server 320, a corresponding messenger chatting group 410 is created through the messenger server 310. According to the creation of the messenger chatting group 410, a group chatting room (or a group chatting window) may be created in the terminals of users logged in by executing a messenger client program.

A group ID, an ID of a group creator, an ID of a group member, ID information of a chatting window, and the like, can be generated, stored, and managed in the messenger chatting group 410. A group ID, an ID of a group creator, an ID of a group member, and the like, may also be generated, stored, and managed in the cloud sharing group 420. The messenger chatting group 410 and the cloud sharing group 420 may share information with each other and use the same information, or map different information to each other by a mapping table, or use different information. The cloud sharing group 420 may include sharing folder position information of the cloud sharing group.

Hereinafter, structures of a system and an apparatus according to the exemplary embodiments of the present invention will be described with reference to FIG. 5 to FIG. 7 and a service procedure according to the exemplary embodiments of the present invention will be described in detail with reference to FIG. 8 and FIG. 9.

Group Messaging System

Figure 5:
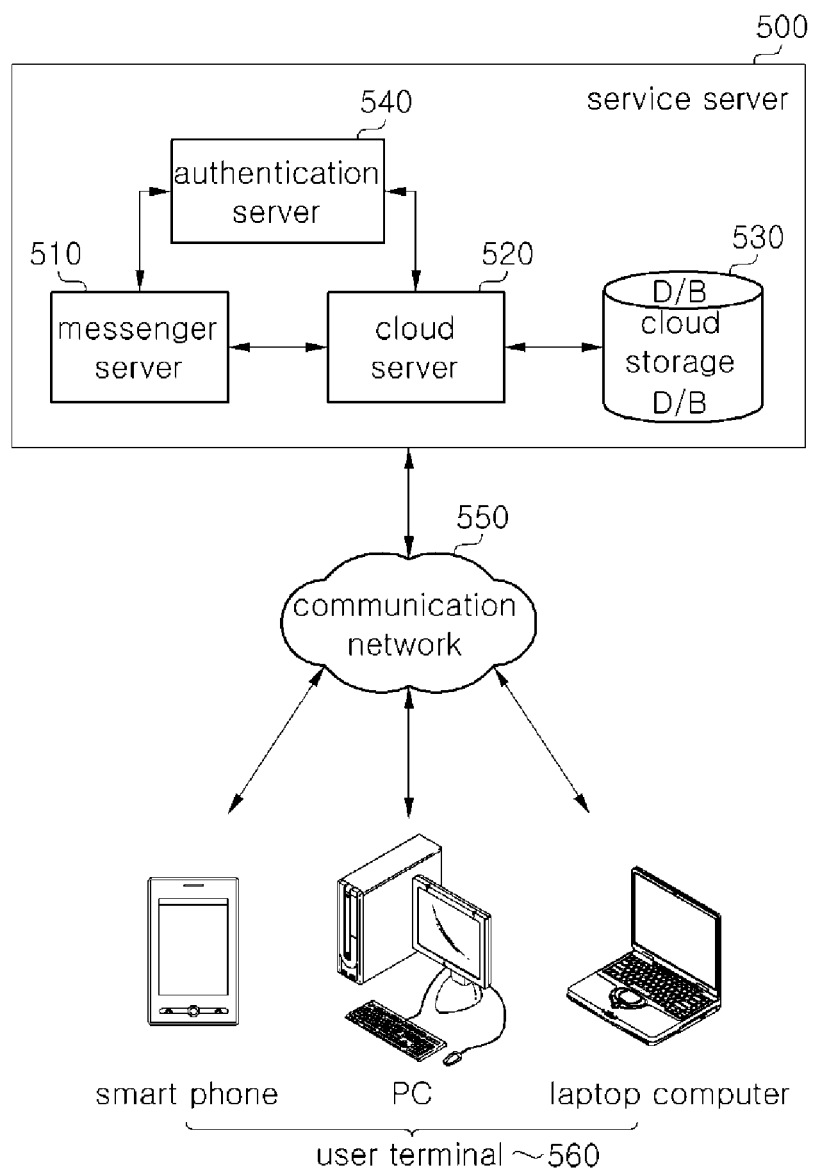
FIG. 5 illustrates a group messaging system for providing file sharing through bidirectional interlock with a cloud server according to the exemplary embodiments of the present invention.

FIG. 5 illustrates a group messaging system for providing file sharing through a bidirectional interlock with a cloud server according to the exemplary embodiments of the present invention. A service server 500 of a service operator is connected to a plurality of user terminals 560 in which a messenger program, a cloud sharing program, or the like, is executed through a communication network 550. The service server 500 may include a messenger server 510, a cloud server 520, a cloud storage 530, an authentication server 540, and the like, wherein the messenger server 510 and the cloud server 520 interlock with each other according to the exemplary embodiments of the present invention. The authentication server 540 may authenticate an access of the user terminal to the cloud server 520 either concurrently or simultaneously with authenticating an access of the user terminal to the messenger server 510.

Although the case in which the messenger server 510 and the cloud server 520 are included in the service server 500 of the same operator is shown in FIG. 5, the present invention is not limited thereto. The messenger server 510 and the cloud server 520 may be operated by different operators and interlock with each other.

The communication network 550 may include wired communication, wireless communication and the like. The communication network 550 may include various communication networks, such as, a personal area network (PAN), a local area network (LAN), a metropolitan area network (MAN), a wide area network (WAN), and the like. The communication network 550 may be the known World Wide Web (WWW) and use a wireless transmission technology used in short range communication, such as, infrared data association (IrDA) or Bluetooth.

According to the exemplary embodiments of the present invention, the user terminal 560 may access the messenger server 510 to receive various messenger related services (particularly, a group messaging service) and access the cloud server 520 through the messenger server 510. The user terminal 560 may access the cloud server 520 to receive various cloud related services and access the messenger server 510 through the cloud server 520.

The authentication server 540 may perform authentication, or the like, for the user terminals 560 and simultaneously perform authentication for access to the messenger server 510 and access to the cloud server 520. As the messenger server 510 and the cloud server 520 interlock with each other, the authentication server may share authentication information for the respective servers and perform the authentication of the user terminal 560 by the same authentication information. In some embodiments, the authentication server 540 may use different authentication information for authenticating a user for each of the messenger server 510 and the cloud server 520.

The cloud storage 530 provides a storing space allocated to a cloud sharing group created through the cloud server 520 according to the exemplary embodiments of the present invention. The cloud storage 530 may store files uploaded for each sharing group and may store information, for example, evaluation information, comment information, and the like, related to the stored files. The cloud storage 530 may include information related to the sharing group and separately store the files and the file related information for each sharing group. The cloud storage 530 may include a plurality of databases. The cloud storage 530 may include a database including partial information or the entire information may be positioned at another database, as shown in FIG. 7.

The user terminal 560 according to the exemplary embodiments of the present invention may be a digital device including an input/output function for communicating with the service server 500 through the communication network 500 in order for the user to perform messenger access, file sharing, and the like. The user terminal 560 may include a memory unit and a microprocessor, such as, a desktop computer, a laptop computer, a workstation, a palmtop computer, a personal digital assistance (PDA), a web pad, a mobile communication terminal including a smart phone, and the like.

Figure 6:
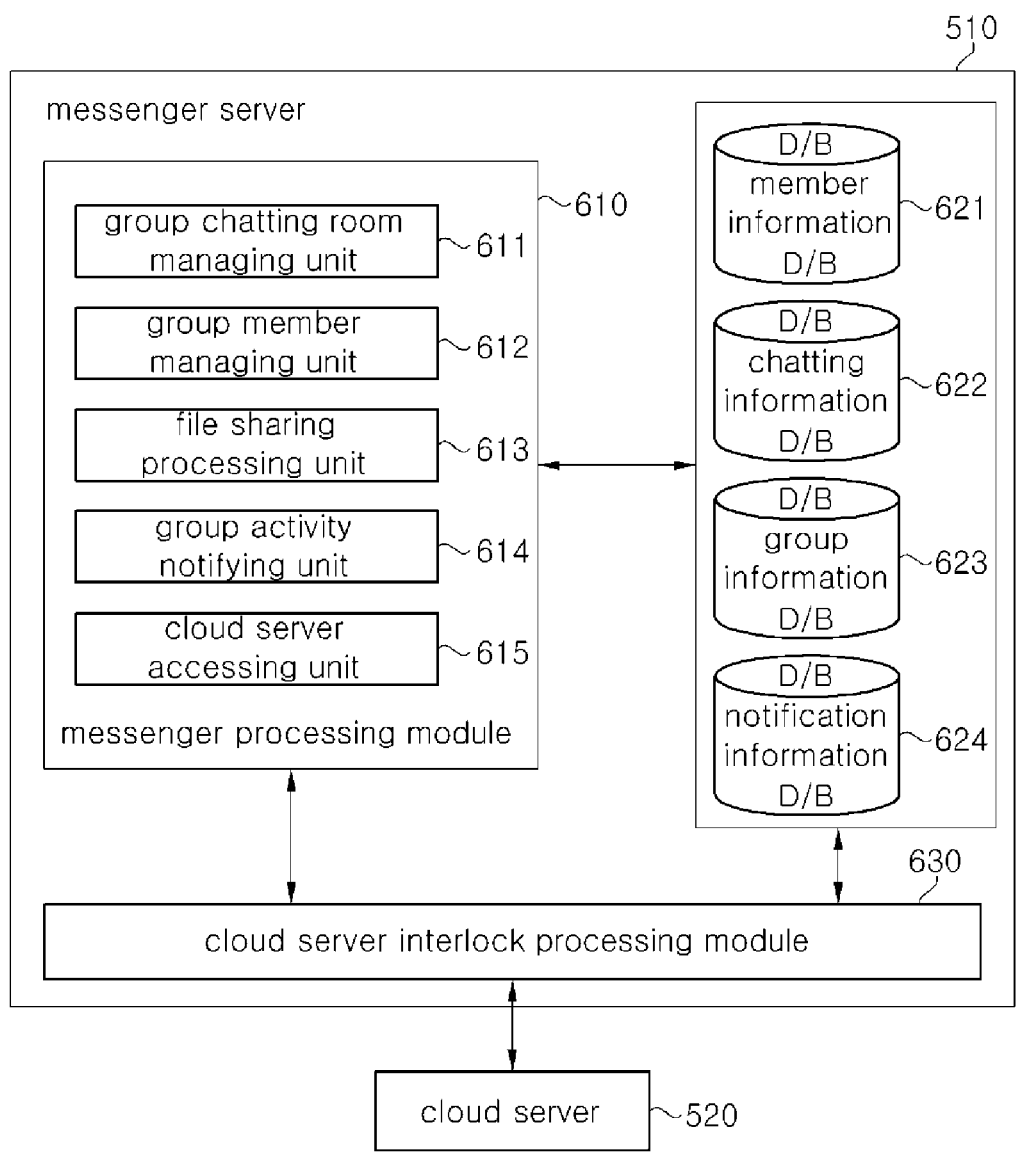
FIG. 6 illustrates a messenger server according to the exemplary embodiments of the present invention.

FIG. 6 illustrates a messenger server according to exemplary embodiments of the present invention. The messenger server 510 may include a messenger processing module 610, databases storing various related data, and a cloud server interlock processing module 630 performing an interlock function with the cloud server 520. The messenger processing module 610 may include a group chatting room managing unit 611, a group member managing unit 612, a file sharing processing unit 613, a group activity notifying unit 614, a cloud server accessing unit 615, and the like. All or some of detailed functional units included in the messenger processing module 610 of the messenger server 510 may be included in a client program installed in the user terminal, and some of the detailed functional units may interlock with each other or be distributed and processed by a server and a client system.

The group chatting room managing unit 611 provides creation of a group chatting room, creation of a chatting window, and the like, when the user requests or allows the creation of the group chatting room. A group chatting room creator may select a plurality of chatting participants to create the group chatting room. According to the exemplary embodiments of the present invention, when a sharing group is created through the cloud server 520 interlocking with the messenger server 510, the group chatting room managing unit 611 can automatically create a group chatting room mapped to the created sharing group in, for example, a one-to-one scheme.

The group member managing unit 612 manages group members included in the group selected by the group creator. The group member managing unit 612 adds, deletes or updates a group member according to a request of the group creator.

When a specific user in the group requests sharing of the file, the file sharing processing unit 613 transmits a file to the cloud server 520 through the cloud server interlock processing module 630 to store the file in a cloud sharing group, for example, in a sharing folder of the corresponding group. All group members may share the file with one another and use the file without transmitting the file individually to the respective group members as in the related art.

The group activity notifying unit 614 receives information on an activity for the file stored in the cloud sharing group from the cloud server 520 through the cloud server interlock processing module 630. The group activity notifying unit 614 may notifies the created group chatting window of the received information.

The cloud server accessing unit 615 provides an interface so that the user terminals accessing the messenger server 510 may access the cloud server 520. The user accessing the messenger server 510 through the cloud server accessing unit 615 may easily access the cloud server 520 without performing a separate cloud server 520 accessing or log-in procedure. The access interface may be included in a predetermined position, menu, or the like, of the messenger client program and may select link information in the group chatting window. According to exemplary embodiments of the present invention, the cloud server accessing unit 615 may be included in the authentication server 540 that includes a messenger server accessing unit (not shown), a member information database 621, and/or a member information database 721. The cloud server accessing unit 615 may provide an authentication function for accessing the messenger server 510 and/or the cloud server 520 through the authentication server 540.

The member information database 621 may store member related information of users subscribing to the messenger server 510. The member information database 621 may be shared with the member information database 721 included in the cloud server 520 of FIG. 7. A chatting information database 622 may store information, such as, various texts, images, files, and the like, chatted in the chatting room. A group information database 623 may store information, for example, a group ID, a group member ID, and the like, related to the creation of the group chatting room. The group information database 623 may be shared with a group information database 723 included in the cloud server 520 of FIG. 7. The group information database 623 and the group information database 723 may be present as a single database and be stored in a separate storing space that may be accessed by both of the messenger server 510 and the cloud server 520. A notification information database 624 may store file sharing activity related notification contents received from the cloud server 520 and display the notification contents through the group chatting window.

The cloud server interlock processing module 630 performs a function of interlocking with the cloud server 520 in the messenger server 510 to process various data, when the group chatting room or the cloud sharing group is created. In some embodiments, interlocking can include a hardware or software method of coordinating and/or synchronizing multiple processes in a computer or computer network. The process is used, for example, when a certain process should not begin until another process has completely terminated, like a creating of cloud sharing group should not begin until the message sharing group has completed. In some embodiments, the interlock is implemented using a flag, a semaphore, a mutex, and the like.

Figure 7:
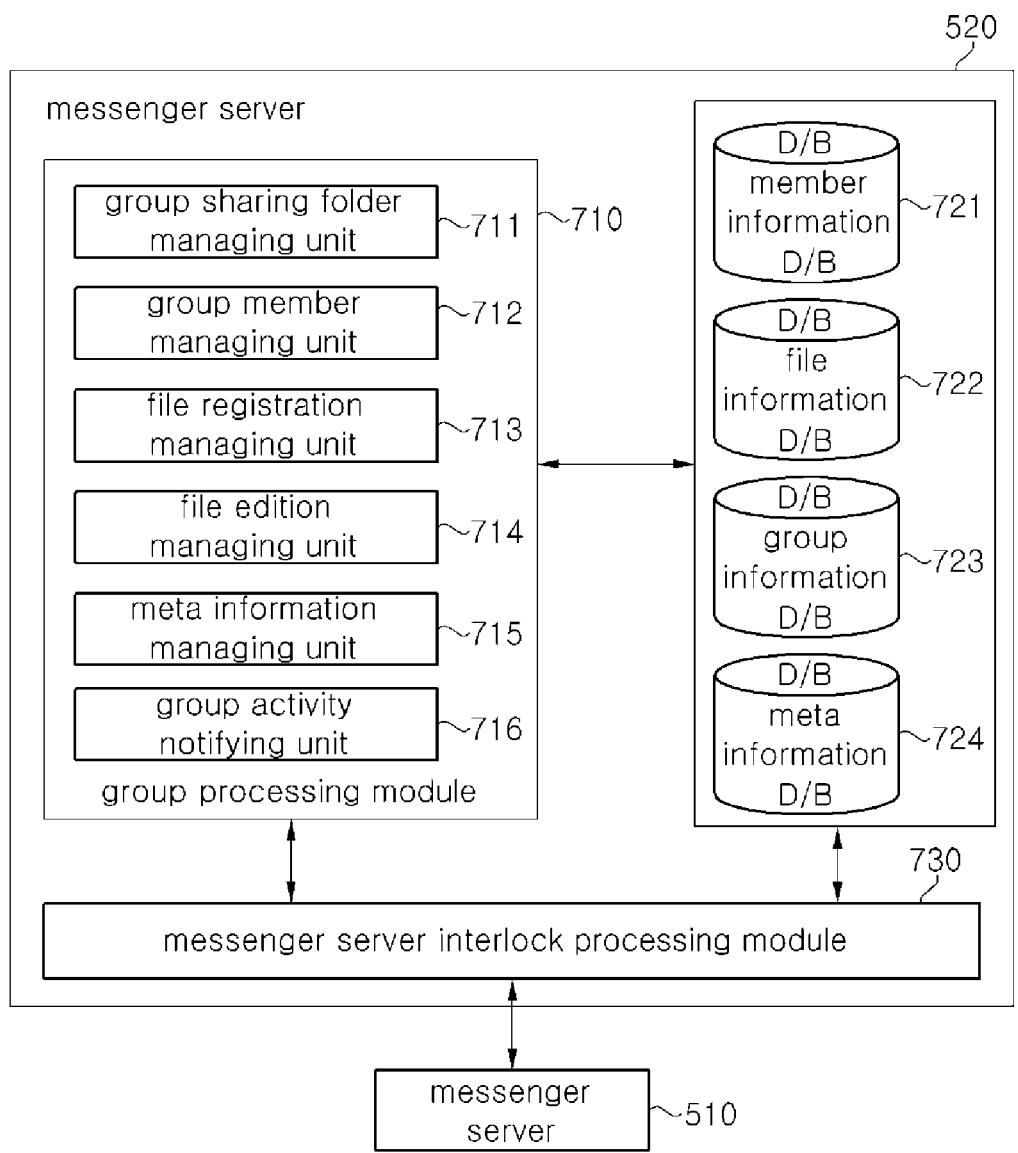
FIG. 7 illustrates a cloud server according to the exemplary embodiments of the present invention.

FIG. 7 a cloud server according to the exemplary embodiments of the present invention. The cloud server 520 may include a group processing module 710 processing a group sharing function of the cloud, databases storing various related data, and a messenger server interlock processing module 730 performing an interlock function with the messenger server 510. The group processing module 710 may be configured to include a group sharing folder managing unit 711, a group member managing unit 712, a file registration managing unit 713, a file edition managing unit 714, a meta information managing unit 715, a group activity notifying unit 716, and the like.

The group sharing folder managing unit 711 manages a sharing folder for a group when a group is created by users accessing the cloud server 520. The group sharing folder managing unit 711 receives information related to the messenger chatting group from the messenger server 510 to automatically create a cloud sharing group.

The group member managing unit 712 manages group members included in the group selected by the group creator and adds or deletes a group member according to a request of a user, for example, the group creator. The group member managing unit 712 receives changed information on the group members managed through the messenger server 510 to update the group information database 723.

The file registration managing unit 713 receives a file registered through the group chatting room in the messenger program from the messenger server 510 (or in a P2P scheme) and stores the received shared file in a file information database 722. The file registration managing unit 713 may store an uploaded file in the file information database 722 when the user directly accesses the cloud server 520 to upload the file.

The file edition managing unit 714 may allow the members in the sharing group to edit the uploaded shared file and disallow other members from editing the file while editing. For example, a plurality of users may be disallowed from either simultaneously or concurrently editing a specific through a control, for example, by using a semaphore or a Mutex scheme.

The meta information managing unit 715 may register and process meta information with respect to the uploaded file. The meta information may be separately added and stored in connection with a file rather than in the actual content of the file. The meta information may be information, such as, a file creation date, a file modification data, a file creator, a file modifier, a file size, a file storing path, a comment for the file, an evaluation mark, or the like.

The group activity notifying unit 716 may notify the messenger server 510 that a group activity for the file has been generated, for example, through the messenger server interlock processing module 730, when group activity is generated through the file registration managing unit 713, the file edition managing unit 714, the meta information managing unit 715, and the like. The group activity may include, for example, a modification of the file (a modification of the group document, or the like), a meta activity for the file (for example, a comment, evaluation registration, or the like), and the like.

The group processing module 710 may further include a messenger server accessing unit (not shown). The messenger server accessing unit may provide an interface so that the terminals accessing the cloud server 520 may access the messenger server 510 through the cloud server 520. The user accessing the cloud server 520 through the messenger server accessing unit may access the messenger server 510 without performing a separate messenger server 510 accessing or log-in procedure. The access interface may be disposed in a predetermined position, menu, or the like, of a cloud service program.

The member information database 721 may store member information that may be shared with the member information database 621 included in the messenger server 510 of FIG. 6. The file information database 722 may store a file uploaded in the corresponding cloud sharing group. The file information database 722 may store the respective members included in the corresponding group authorized to read and edit the file. A group information database 723 may store information, for example, a group ID, a group member ID, and the like, related to the group. Group information database 723 may be shared with the group information database 623 included in the messenger server 510 of FIG. 6. A meta information database 724 may store meta information for the registered file as described above.

The messenger server interlock processing module 730 performs a function of interlocking with the messenger server 510 in the cloud server 520 to process various data, when the group chatting room is created, the cloud sharing group is created, or various sharing activities are generated according to the exemplary embodiments of the present invention.

Group Messaging Method

Figure 8:
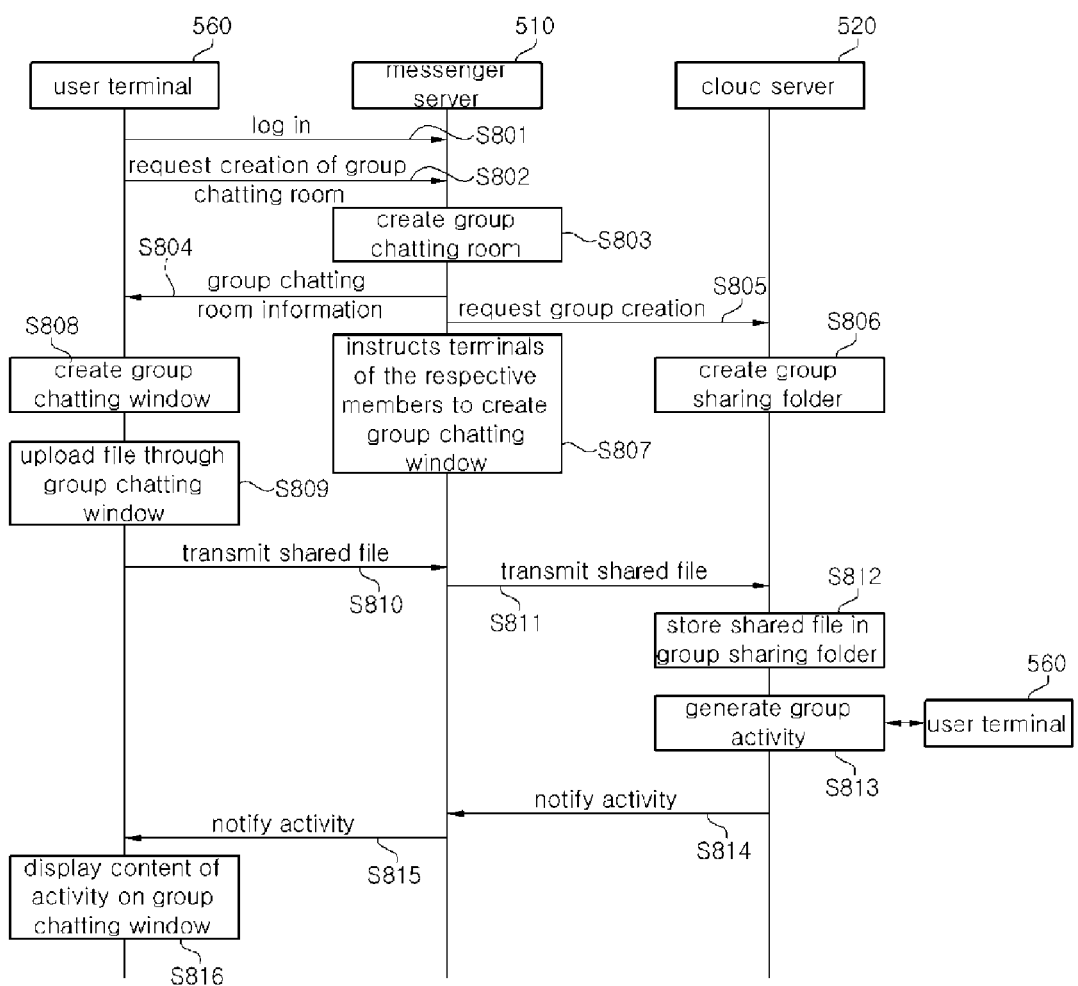
FIG. 8 illustrates a group messaging signal flow chart for providing file sharing through bidirectional interlock with a cloud server according to exemplary embodiments of the present invention.

FIG. 8 illustrates a group messaging signal flow chart for providing file sharing through bidirectional interlock with a cloud server according to exemplary embodiments of the present invention. The respective users in the sharing group may share the file with one another through the group chatting window created on a user terminal and confirm an activity for the shared file in real time. When a user logs in the messenger server 510 through the user terminal 560 (S801) and requests creation of a group chatting room (S802). The messenger server 510 creates the group chatting room (S803) and stores various group related information in a database. The group chatting room information related to the creation of the group is the provided to the user terminal 560 (S804), and the user terminal 560 creates a group chatting window based on the group chatting room information (S808). In some embodiments, the user may either simultaneously or concurrently perform the chatting with members in the corresponding group through the created group chatting window or transmit the file.

The messenger server 510 transmits a group creation request (S805) information to the cloud server 520 interlocking with the messenger server 510. The cloud server 520 creates a cloud sharing group based on corresponding group related information according to the group creation request. For example, the cloud server 520 may create a group sharing folder corresponding to the created group (S806) and allocates a storing space to the created group sharing folder.

The messenger server 510 may instruct the user terminals of the group members of the group chatting room to create the group chatting window (S807). In some embodiments, the group chatting window is automatically created in the user terminals of the group members.

According to the exemplary embodiments of the present invention, when a file is uploaded through the created group chatting window (S809), the uploaded file is transmitted to the cloud server 520 interlocking with the messenger server 510 through the messenger server 510 (or in the P2P scheme) (S810 and S811). The cloud server 520 may store the transmitted shared file in the created corresponding group sharing folder (S812). The file stored in the group sharing folder is set to be accessible by members of the corresponding group.

When a group activity for the stored file is generated (S813), the generated group activity is transmitted to the user terminals 560 of the members of the corresponding group through the messenger server 510 (S814 and S815). The respective user terminals 560 may display contents of the transmitted group activity on the created group chatting window (S816).

Figure 9:
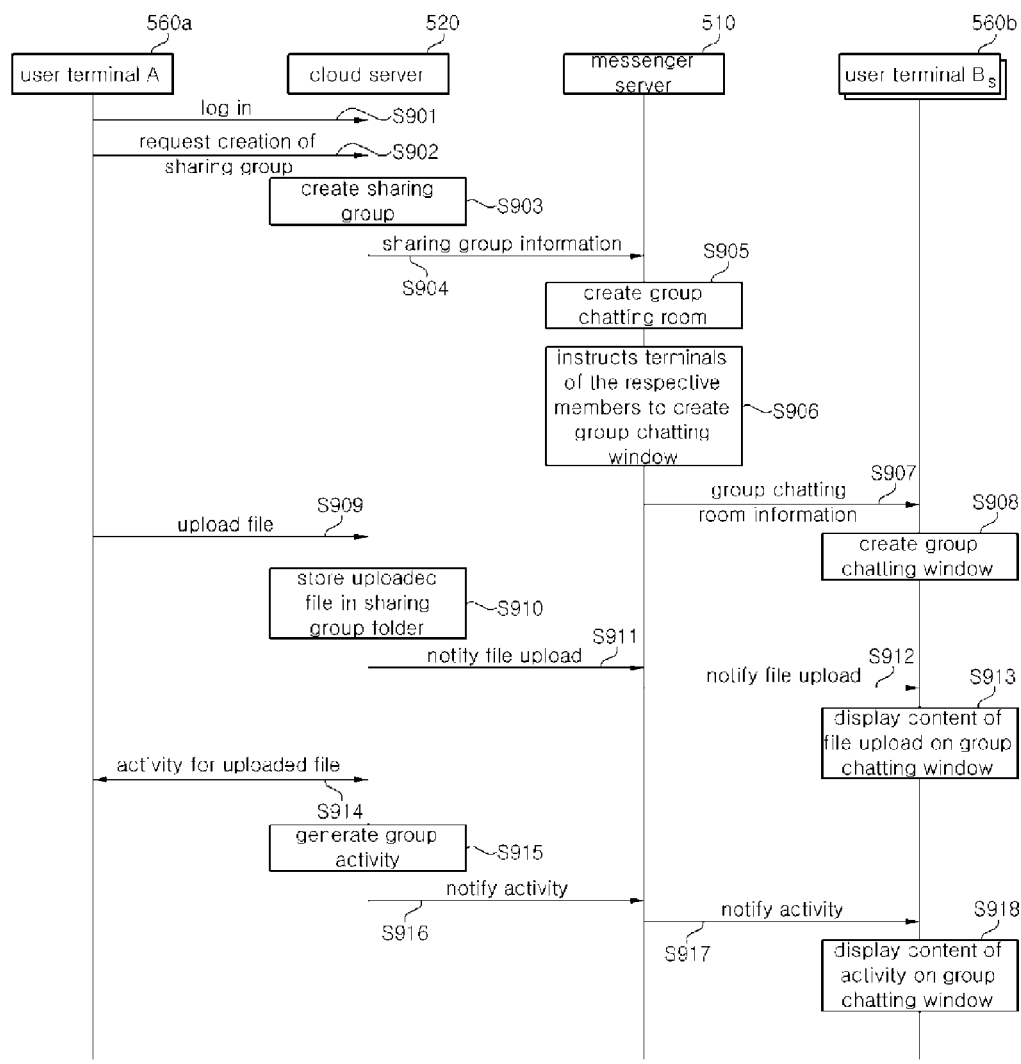
FIG. 9 illustrates a group messaging signal flow chart for providing file sharing through bidirectional interlock with a cloud server according to exemplary embodiments of the present invention.

FIG. 9 illustrates a signal flow chart for providing file sharing through bidirectional interlock with a cloud server according to exemplary embodiments of the present invention. When a user terminal A 560a accesses and logs in the cloud server 520 (S901) and requests creation of a sharing group (S902), the cloud server 520 creates the sharing group according to the request (S903).

According to the exemplary embodiments of the present invention, information on the created sharing group is transmitted to the messenger server 510 interlocking with the cloud server 520 (S904). The messenger server 510 may create the group chatting room with reference to the transmitted information on the sharing group (S905) and may instruct the user terminals of the members included in the created group to create the group chatting window (S906). Therefore, information on the group chatting room is transmitted to a plurality of user terminals BS 560b (S907), and the respective user terminals 560 automatically creates the group chatting window through the transmitted information (S908). The group chatting window may be created in the messenger program of a user terminal logged in as a member of the group.

According to the exemplary embodiments of the present invention, when the user terminal A 560a uploads the file in the sharing group of the cloud server 520 (S909), the uploaded file is stored in the sharing group folder (S910). The messenger server 510 and the user terminal BS 560b of all corresponding members may be notified of the file upload (S911, S912). The respective user terminals 560 receiving the file upload notification may display the contents for the file upload on the created group chatting window (S913), for example, as shown in FIG. 10.

Figure 11:
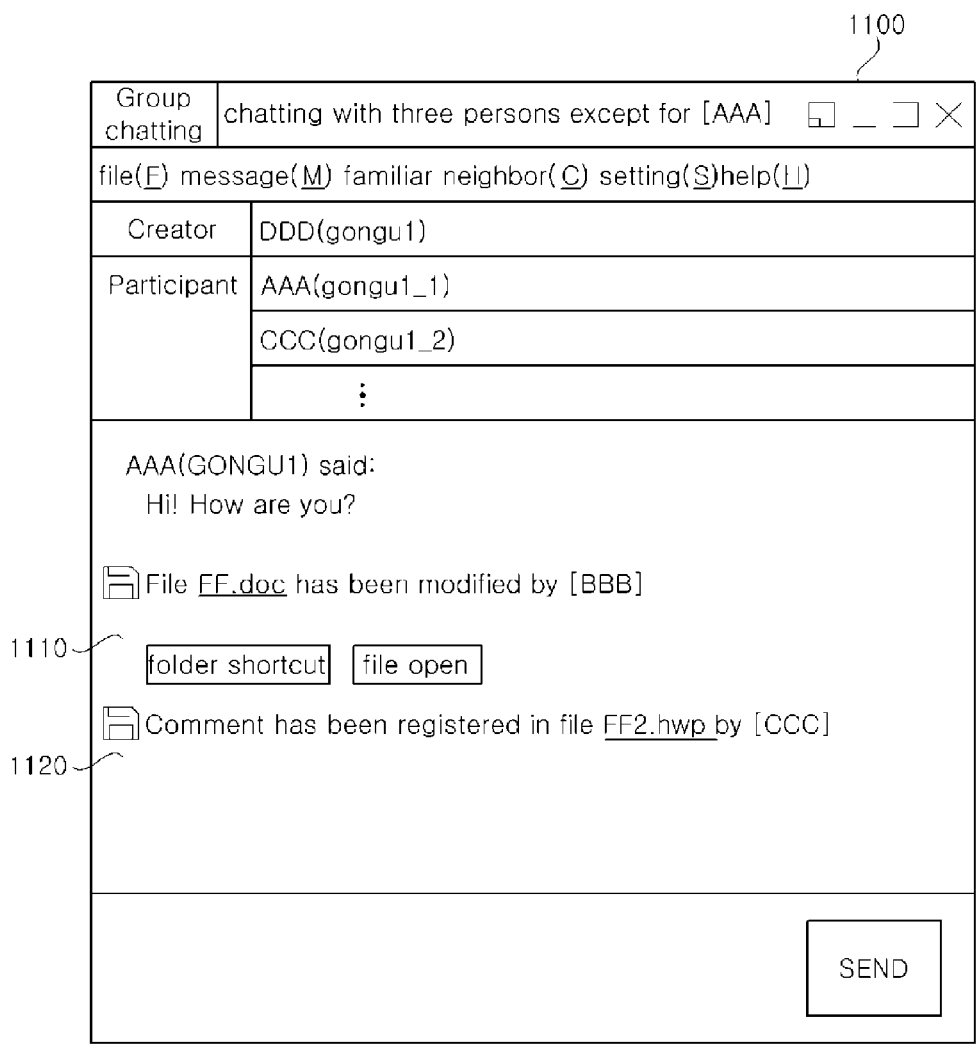
FIG. 11 illustrates group activity notification through the group chatting window according to exemplary embodiments of the present invention.

According to the exemplary embodiments of the present invention, when various sharing activities for the uploaded shared file are generated in the user terminal A 560a through the cloud server 520 (S914 and S915), the generated sharing activities are notified to the messenger server 510 (S916). The messenger server 510 notifies the user terminals BS 560b of all members in the corresponding group of the sharing activity (S917). The respective user terminals 560 receiving the sharing activity notification displays contents for the sharing activity on the created group chatting window (S918), for example, as shown in FIG. 11.

EXAMPLE

Figure 10:
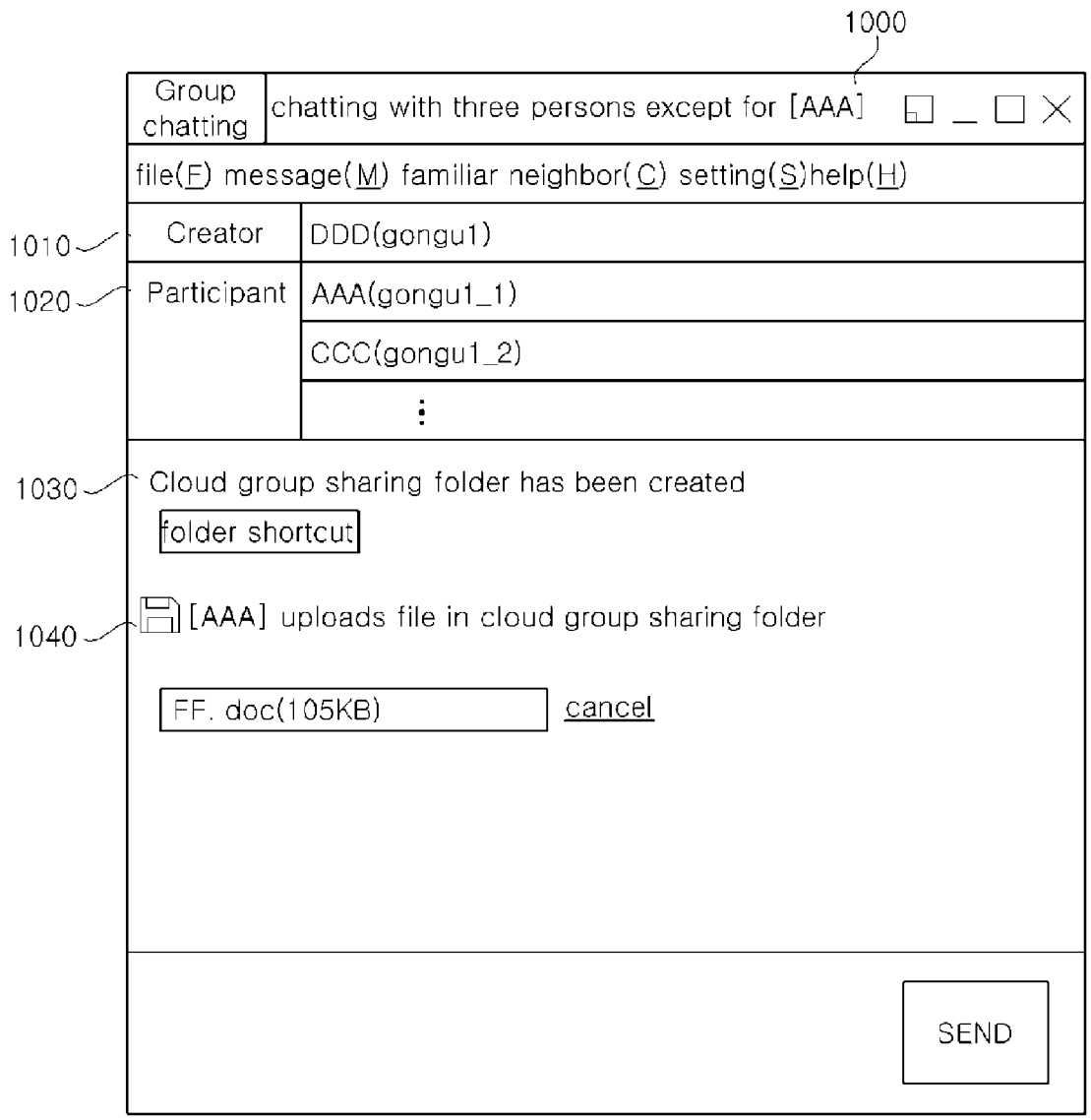
FIG. 10 illustrates file sharing through a group chatting window according to exemplary embodiments of the present invention.

FIG. 10 illustrates file sharing through a group chatting window according to the exemplary embodiments of the present invention. When a plurality of chatting targets are selected to perform group chatting, a group chatting room with a corresponding group chatting window 1000 is created. The group chatting window 1000 may display information on a group creator 1010 and information on chatting participants 1020 (that is, group members).

According to the exemplary embodiments of the present invention, when the group chatting window 1000 is created, a cloud group sharing folder mapped to a chatting group in a cloud storage in the one-to-one scheme may be automatically created through the cloud server interlocking with the messenger server. In some embodiments, it is also possible to access the corresponding sharing folder through a folder shortcut menu in the chatting window. Information 1030 informing the creation of the cloud group sharing folder may be displayed on the group chatting window 1000.

A specific file stored in a local device or a personal cloud server of the user may be uploaded through the group chatting window. When the file is uploaded it is created in the cloud group sharing folder, and a state of a file upload 1040 may be displayed on the group chatting window 1000 of all members in the group. All members in the corresponding group may access the uploaded file to perform various activity works including reading or editing.

For example, when a member 'AAA' among the group members uploads a file "FF.doc" through the group chatting window, the state of the file upload 1040, such as, "[AAA] uploads a file in a cloud group sharing folder" is displayed on the group chatting window 1000 of all group members.

FIG. 11 illustrates group activity notification through the group chatting window according to the exemplary embodiments of the present invention. A group activity for a shared file may be notified through the created group chatting window 1100. When a modification or a comment is registered for the file uploaded in the cloud group sharing folder, a name of the member performing the corresponding activity and a content of the corresponding activity may be displayed on the group chatting window 1100.

For example, when a member 'BBB' among the group members modifies a file 'FF.doc', a file modifying notification 1110, such as, "File FF.doc has been modified by [BBB]" may be displayed on the group chatting window 1100 of all group members. A shortcut to the cloud sharing folder in which the corresponding file is stored may be executed or the corresponding file may be directly accessed.

When a member 'CCC' among the group members registers a comment in a file 'FF2.hwp', a comment registering notification 1120, such as, "Comment has been registered in file FF2.hwp by [CCC]" may be displayed on the group chatting window 1100 of all group members. This permits all group members to confirm an activity for the file.

FIG. 12 illustrates a cloud group sharing room according to the exemplary embodiments of the present invention. Basic information, for example, group creator information 1210, group member information 1220, and the like, related to the group and a list of files uploaded in a sharing folder 1240 and information on the respective uploaded files may be displayed on a created cloud group sharing room 1200. The file information can include, for example, a file name, a file registrant, a current state, a final modifying date, an evaluation mark, a replay, and the like.

In some embodiments, a shortcut to the group chatting window of the messenger may be mapped to the cloud group in the one-to-one scheme through a group chatting window shortcut 1230 menu.

Hereinabove, although the present invention is described by specific matters such as concrete components, and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. A group messaging system comprising:
a messenger server configured to receive a request to create a group chatting room for messenger group members, configured to create the group chatting room in the messenger server, and configured to instruct at least one user terminal corresponding to one or more of the messenger group members to create a group chatting window in the at least one user terminal; and
a cloud server configured to interlock with the messenger server, configured to receive information about the creation of the group chatting room from the messenger server, and configured to create a cloud sharing group mapped to the group chatting room in a one-to-one scheme,
wherein the messenger server is configured to receive from the cloud server activity information relating to a file in the cloud server, and
wherein when the cloud server receives a request to create a cloud sharing group from a user terminal in communication with the cloud server, the cloud server transmits, to the messenger server, information related to the cloud sharing group created by the cloud server in response to the request from the user terminal, and the messenger server creates the group chatting room mapped to the cloud sharing group created in response to the request from the user terminal.

2. The group messaging system of claim 1, wherein the cloud server is configured to receive the file through the group chatting window in the at least one user terminal corresponding to one or more of the messenger group members, and to store the file in a sharing group folder corresponding to the cloud sharing group of the cloud server.

3. The group messaging system of claim 2, wherein the cloud server is configured to grant authority to access the file stored in the sharing group folder to cloud sharing members of the cloud sharing group.

4. The group messaging system of claim 2, wherein the cloud server is configured to transmit the activity information relating to the file stored in the sharing group folder to the messenger server.

5. The group messaging system of claim 4, wherein the at least one user terminal corresponding to one or more of the messenger group members is configured to display the activity information in the group chatting window.

6. The group messaging system of claim 4, wherein the activity information comprises one or more of registering of the file, reading of the file, modifying of the file, registering of a reply to the file, and granting of an evaluation mark for the file.

7. A messenger server in a group messaging system, comprising:
a group chatting room managing unit configured to receive a request to create a group chatting room for messenger group members, configured to create the group chatting room, and configured to instruct at least one user terminal corresponding to one or more of the messenger group members to create a group chatting window in the at least one user terminal;
a storage configured to store the group chatting room and the messenger group members;
a cloud server interlock processing module configured to interlock with a cloud server, and configured to request the cloud server to create a cloud sharing group mapped to the created group chatting room in a one-to-one scheme, when the group chatting room is created through the group chatting room managing unit; and
a group activity notifying unit configured to receive from the cloud server activity information relating to a file stored in the cloud server,
wherein when the cloud server receives a request to create a cloud sharing group from a user terminal in communication with the cloud server, the cloud server interlock processing module is further configured to receive information related to the cloud sharing group created by the cloud server in response to the request from the user terminal, and the group chatting room managing unit is further configured to create a group chatting room mapped to the cloud sharing group created in response to the request from the user terminal.

8. The messenger server of claim 7, further comprising a file sharing processing unit configured to store the file in a sharing group folder corresponding to the cloud sharing group of the cloud server, when the file is uploaded through the group chatting window.

9. The messenger server of claim 8, wherein the group activity notifying unit is configured to receive the activity information for the file stored in the sharing group folder from the cloud server and configured to process the activity information so as to display the activity information in the group chatting window.

10. The messenger server of claim 9, wherein the activity information comprises one or more of registering of the file, reading of the file, modifying of the file, registering of a reply to the file, and granting of an evaluation mark for the file.

11. The messenger server of claim 7, further comprising a cloud server accessing unit configured to access the cloud server through the created group chatting window.

12. A cloud server in a group messaging system, comprising:
a group sharing folder managing unit configured to create a cloud sharing group according to a request from a user terminal, wherein the user terminal corresponds to one of a cloud sharing members of the cloud sharing group;
a storage configured to store files accessible by the cloud sharing group; and
a messenger server interlock processing module configured to interlock with a messenger server, and configured to request the messenger server to create a group chatting room mapped to the cloud sharing group, in response to a request received from the user terminal, in a one-to-one scheme, when the cloud sharing group is created through the group sharing folder managing unit.

13. A group messaging method performed by a messenger server, the group messaging method comprising:
receiving a request to create a group chatting room for messenger group members;
creating the group chatting room in the messenger server;
instructing at least one user terminal corresponding to one or more of the messenger group members to create a group chatting window;
interlocking with a cloud server and requesting the cloud server to create a cloud sharing group mapped to the group chatting room in a one-to-one scheme;
receiving from the cloud server activity information relating to a file stored in the cloud server;
receiving information related to a cloud sharing group created by the cloud server, the cloud sharing group being created in response to a request from a user terminal in communication with the cloud server; and
creating the group chatting room mapped to the cloud sharing group created in response to the request from the user terminal.

14. The group messaging method of claim 13, further comprising:
- receiving in the group chatting room a file uploaded by a user terminal; and
- transmitting the file to be stored in a sharing group folder corresponding to the cloud sharing group of the cloud server.

15. The group messaging method of claim 13, wherein the messenger server receives the activity information for the file stored in the sharing group folder from the cloud server and the activity information is displayed on the group chatting window.

16. The group messaging method of claim 15, wherein the activity information comprises one or more of registering of the file, reading of the file, modifying of the file, registering of a reply to the file, and granting of an evaluation mark for the file.

17. A group messaging method performed by a user terminal in communication with a messenger server, the group messaging method comprising:
- receiving information related to creation of a group chatting room including messenger group members from the messenger server and creating a group chatting window based on the information; and
- receiving selection of a file and uploading the selected file through the group chatting window,
- wherein the uploaded file is stored in a sharing group folder corresponding to a cloud sharing group of a cloud server,
- wherein the cloud sharing group and the group chatting room are mapped in a one-to-one scheme, and
- wherein when activity information for the file stored in the sharing group folder is generated, the activity information is received and displayed on the created group chatting window,
- wherein when the cloud server receives a request to create a cloud sharing group from the user terminal in communication with the cloud server, the cloud server transmits information related to the cloud sharing group created by the cloud server in response to the request from the user terminal, and the messenger server creates the group chatting room mapped to the cloud sharing group created in response to the request from the user terminal.

18. A non-transitory computer readable medium storing an executable program which, when executed, instructs a messenger server in a group messaging system to perform the method comprising:
- receiving, at the messenger server, a request to create a group chatting room for messenger group members;
- creating the group chatting room in the messenger server;
- instructing at least one user terminal corresponding to one or more of the messenger group members to create the group chatting window in the user terminal;
- interlocking with a cloud server and requesting the cloud server to create a cloud sharing group mapped to the group chatting room in a one-to-one scheme;
- receiving from the cloud server activity information relating to a file stored in the cloud server;
- receiving information related to a cloud sharing group created by the cloud server, the cloud sharing group being created in response to a request from a user terminal in communication with the cloud server; and
- creating the group chatting room mapped to the cloud sharing group created in response to the request from the user terminal.

19. The group messaging system of claim 1, further comprising a network connecting the messenger server and the cloud server,
- wherein the interlock comprises bidirectional interlocking implemented over the network.

20. The group messaging system of claim 2, wherein the file is synchronized between the cloud server and the user terminal corresponding to one or more of the messenger group members.

21. The messenger server of claim 7, further comprising a network connecting the messenger server and the cloud server,
- wherein the interlock comprises bidirectional interlocking implemented over the network.

22. The messenger server of claim 8, wherein the file is synchronized between the cloud server and the user terminal corresponding to one or more of the messenger group members.

* * * * *